(12) United States Patent
Obendiek

(10) Patent No.: US 6,637,802 B2
(45) Date of Patent: Oct. 28, 2003

(54) CONVERTIBLE TOP AND DRIVING DEVICE FOR A CONVERTIBLE TOP

(75) Inventor: Klaus Obendiek, Passau (DE)

(73) Assignee: Edscha Cabrio-Verdecksysteme GmbH, Hengersberg (DE)

( * ) Notice: Subject to any disclaimer, the term of this patent is extended or adjusted under 35 U.S.C. 154(b) by 0 days.

(21) Appl. No.: 10/209,686

(22) Filed: Aug. 1, 2002

(65) Prior Publication Data

US 2002/0185886 A1 Dec. 12, 2002

Related U.S. Application Data

(63) Continuation of application No. 09/746,743, filed on Dec. 22, 2000, now Pat. No. 6,478,362.

(30) Foreign Application Priority Data

Dec. 22, 1999 (DE) .......................... 199 62 070
Feb. 23, 2000 (DE) .......................... 100 08 343
Dec. 15, 2000 (DE) .......................... 100 62 787

(51) Int. Cl.[7] ................................. B60J 7/00
(52) U.S. Cl. ..................................... 296/108
(58) Field of Search ........................ 296/107.01, 108, 296/109, 121, 107.09, 107.15, 107.16

(56) References Cited

U.S. PATENT DOCUMENTS 5,207,474 A * 5/1993 Licher et al. .......... 296/107.15
5,746,470 A * 5/1998 Seel et al. ................ 296/108
5,971,470 A * 10/1999 May et al. ............. 296/107.09
6,048,021 A * 4/2000 Sautter, Jr. ............ 296/107.09
6,270,143 B1 * 8/2001 Heselhaus et al. ..... 296/107.09

FOREIGN PATENT DOCUMENTS

EP            835778 A1       4/1998

* cited by examiner

Primary Examiner—Stephen T. Gordon
Assistant Examiner—Lori L Coletta
(74) Attorney, Agent, or Firm—Davidson, Davidson & Kappel, LLC

(57) ABSTRACT

A driving device for a convertible top includes a main bearing having a first fixed bearing point, a first link pivotally connected to the main bearing at the first fixed bearing point, a driving cylinder, a push and pull rod, a first bent link, and a second bent link. The first link includes a double lever having two hinge points each positioned on different sides with respect to the first fixed bearing point. The push and pull rod is coupled to one of the two hinge points via the first bent link and coupled to the other of the two hinge points via the second bent link. The driving cylinder provides a force acting upon the push and pull rod.

10 Claims, 12 Drawing Sheets

CONVERTIBLE TOP AND DRIVING DEVICE FOR A CONVERTIBLE TOP

CROSS-REFERENCE TO RELATED APPLICATION

The present application is a continuation of U.S. Ser. No. 09/746,743 filed Dec. 22, 2000 now U.S. Pat. No. 6,478,362.

FIELD OF THE INVENTION

The present invention relates to a convertible top for a convertible, comprising a front, a middle and a rear shell piece, said shell pieces, when in the closed state, being arranged as a roof over a passenger compartment. The invention further relates to a driving device for a convertible top, comprising a main bearing, a first link, a second link and a driving cylinder.

DESCRIPTION OF THE PRIOR ART

Up to now collapsible tops known in practice are customarily designed in the form of folding tops, in which a flexible roof skin is stretched over a framework which is swung open out of the region of a trunk over a passenger compartment as far as a windshield. Collapsible tops of this type have proven problematical particularly in a transparent rear region of the collapsible top, i.e. in the region of a rear window which is preferably of rigid design. Also, there are drawbacks in winter for collapsible tops of this type due to a lack of thermal insulation.

Furthermore, collapsible tops made of one or more rigid parts are known. In the sphere of convertibles, collapsible tops of this type are constructed in the form of convertible tops preferably made of two parts or shells. The size of the roof space which is to be covered by the convertible top is not causing problems in this case because of the relatively small passenger cabin with just two proper seats. However, convertible tops are now also increasingly used outside convertibles, sport or leisure vehicles for conventional, four-seater vehicles or saloons. In this case, construction of the convertible top in just two parts is problematical because of the substantially larger passenger cabin, particularly because in an open position the rigid shells of the convertible top usually have to be accommodated behind the rear seat bench in the region of the trunk. Collapsible tops having an essentially three-part roof combination have proven successful here, it also being possible for this combination to comprise three rigid parts. Problems arise in the kinematics for opening and closing convertible tops of this type, with the result that they frequently have to be activated via more than one drive. Furthermore, the usable space in the trunk is excessively restricted by the packed collapsible top. Finally, according to the prior art the arrangement of the drive and the further elements of the drive on or in the convertible top is also problematical, so that parts thereof have even been arranged so that they can be seen from the outside. Among other things, this gives rise to aerodynamic problems and also stability problems.

German laid open publication DE 196 42 154 A1 describes a motor vehicle having a retractable roof which is subdivided into a front, middle and a rear subpiece, it being possible for the front subpiece to be folded in the opposite direction to the middle subpiece and for the middle subpiece to be shifted in the same direction as the rear subpiece. The driving device of the retractable roof comprises a main bearing having two links which are secured pivotably to the main bearing, one of the links being configured such that it can be driven about its pivot axis.

SUMMARY OF THE INVENTION

It is an object of the invention to provide a convertible top having an improved kinematic arrangement.

It is a further object of the invention to provide a driving device for a convertible top, with which a convertible top can be driven reliably and in a space-optimized manner.

It is another object of the invention to provide a convertible having a convertible top according to the invention and a driving device according to the invention for a convertible top.

These and further objects are achieved by the invention.

A convertible top according to the invention comprises a front shell piece, a middle shell piece and a rear shell piece; said shell pieces, when in the closed state, being arranged as a roof over a passenger compartment of the convertible; said front shell piece being capable to be raised during a positively controlled opening operation such that it is moved over the middle shell piece; said rear shell piece being capable to be rotated into a folded-over position; the three shell pieces being designed such that they can jointly pivot counter to a direction of travel about a main bearing into a packaging position; wherein in said packaging position said front shell piece and said middle shell piece are oriented in the same direction over said rear shell piece, that is stored in the folded-over position.

A driving device for a convertible top according to the invention comprises a main bearing, a first link, a second link, an intermediate link, said intermediate link being coupled to said second link for activation purposes, a four-bar linkage, said four-bar linkage being coupled to said first link for activation purposes, a first bearing point, a driving cylinder, said driving cylinder being coupled with said main bearing at said first bearing point, and a push and pull rod, said push and pull rod being driven by said driving cylinder and being designed for a simultaneous action of force on the intermediate link and the four-bar linkage.

A convertible according to the invention includes a convertible top and a driving device for said convertible top, said convertible top comprising a front shell piece, a middle shell piece and a rear shell piece, said shell pieces, when in the closed state, being arranged as a roof over a passenger compartment of the convertible, said front shell piece being capable to be raised during a positively controlled opening operation such that it is moved over the middle shell piece, said rear shell piece being capable to be rotated into a folded-over position, the three shell pieces being designed such that they can jointly pivot counter to a direction of travel about a main bearing into a packaging position, wherein in said packaging position said front shell piece and said middle shell piece are oriented in the same direction over said rear shell piece, that is stored in the folded-over position, and said driving device comprising a main bearing, a first link, a second link, an intermediate link, said intermediate link being coupled to said second link for activation purposes, a four-bar linkage, said four-bar linkage being coupled to said first link for activation purposes, a first bearing point, a driving cylinder, said driving cylinder being coupled with said main bearing at said first bearing point, and a push and pull rod, said push and pull rod being driven by said driving cylinder and being designed for a simultaneous action of force on the intermediate link and the four-bar linkage.

The convertible top according to the invention comprises a front shell piece, a middle shell piece and a rear shell piece which, when in the closed state, is arranged as a roof over a passenger compartment of a vehicle. It is thereby advantageously possible even to cover large and, in particular, 4-seater vehicles with the convertible top. During the folding process, a positive control of the convertible top is operational in such a manner that first of all the front shell piece is raised and displaced over the middle shell piece. By this means, the front shell piece and the middle shell piece are placed one above the other in the same direction and are transferred into a very compact packing position over the rear shell piece, which can be rotated into a folded-over position. This packing position can be reached as a second end position of a convertible top during the course of a positive control which is described. The packed convertible top is arranged in a known manner behind the rear bench in the region of the trunk of the vehicle.

The type and manner of the above-described positive control for the movement sequence during the opening and closing means that the convertible top is therefore able on the whole to form a very compact packing position. In a development, the positive control is brought about by a chain of four-bar mechanisms which are coupled to one another, in which chain all of the parts of the drive are arranged securely between the shell parts in the packed end position. In this arrangement, the convertible top can also be activated by just one drive and restricts the otherwise freely usable space in the trunk to just a relatively small extent. Furthermore, none of the parts of the drive of a convertible top forming the basis of the invention are arranged so that they can be seen from the outside, and so aerodynamic problems do not arise.

The above-described positive control means that the convertible top is suitable for use with rigid shell parts and also generally for use in partially or completely flexible roof skins. Mixtures of these two forms are also possible, with the result that, in particular, the supporting lengths, which are known from flexible convertible tops, are coupled in a simple manner to a roof skin and are intended for increasing the stability of the convertible top, are replaced by a part which is widened in a shell-like manner and is reinforced. In a development, such a part can be designed for the direct integration of a roll bar or of a plurality of supporting bars of this type, and can be coupled to the flexible roof skin. Furthermore, in a convertible top according to the invention rigid shell parts, for example a rear window, can also be integrated in a simple manner in a roof skin itself, where the roof skin is otherwise flexible.

The driving device according to the invention for a convertible top enables two links, which are connected to a further positive-control means of the convertible top, each to be able to pass through different movements by each having their own coupling in the region of a main bearing, it being advantageous for them both to be driven by the same action of force.

In a preferred embodiment, the input of force into the drive of the convertible top takes place by a hydraulic or pneumatic driving cylinder, a rack or the like. In this case, the construction of the drive is adjusted about a main bearing of a convertible top in such a manner that the input of force is optimized. The effect therefore achieved in particular is that, at the beginning and end of the movement sequence in each direction, the movement when subjected to a high force proceeds slowly and therefore safely and gently for the elements. For this purpose, a four-bar linkage is advantageously provided in the region of the drive, said four-bar linkage bringing about a change to the effective lever arms, which change is matched to the particular state of the convertible top, during the transmission of force. An additional control of the force profile can take place via the input of force.

In a configuration according to the invention of the driving device, an intermediate link is advantageously provided in the coupling of the second link of the convertible top. The effect achieved by this is that the second link of the convertible top not only executes a rotational movement, but also a combined translatory movement with regard to a fixed bearing point of the driving device. By suitably configuring this coupling, jamming of the entire linkage mechanism of the convertible top can effectively be avoided.

Further advantageous designs and developments of a driving device according to the invention and of a convertible top are the subject-matter of dependent claims and of the following description of a preferred embodiment of the invention.

A preferred embodiment of a convertible top according to the invention and of a driving device according to the invention for a convertible top is explained in greater detail below with reference to the associated drawings.

DETAILED DESCRIPTION OF A PREFERRED EMBODIMENT

Figure 1:
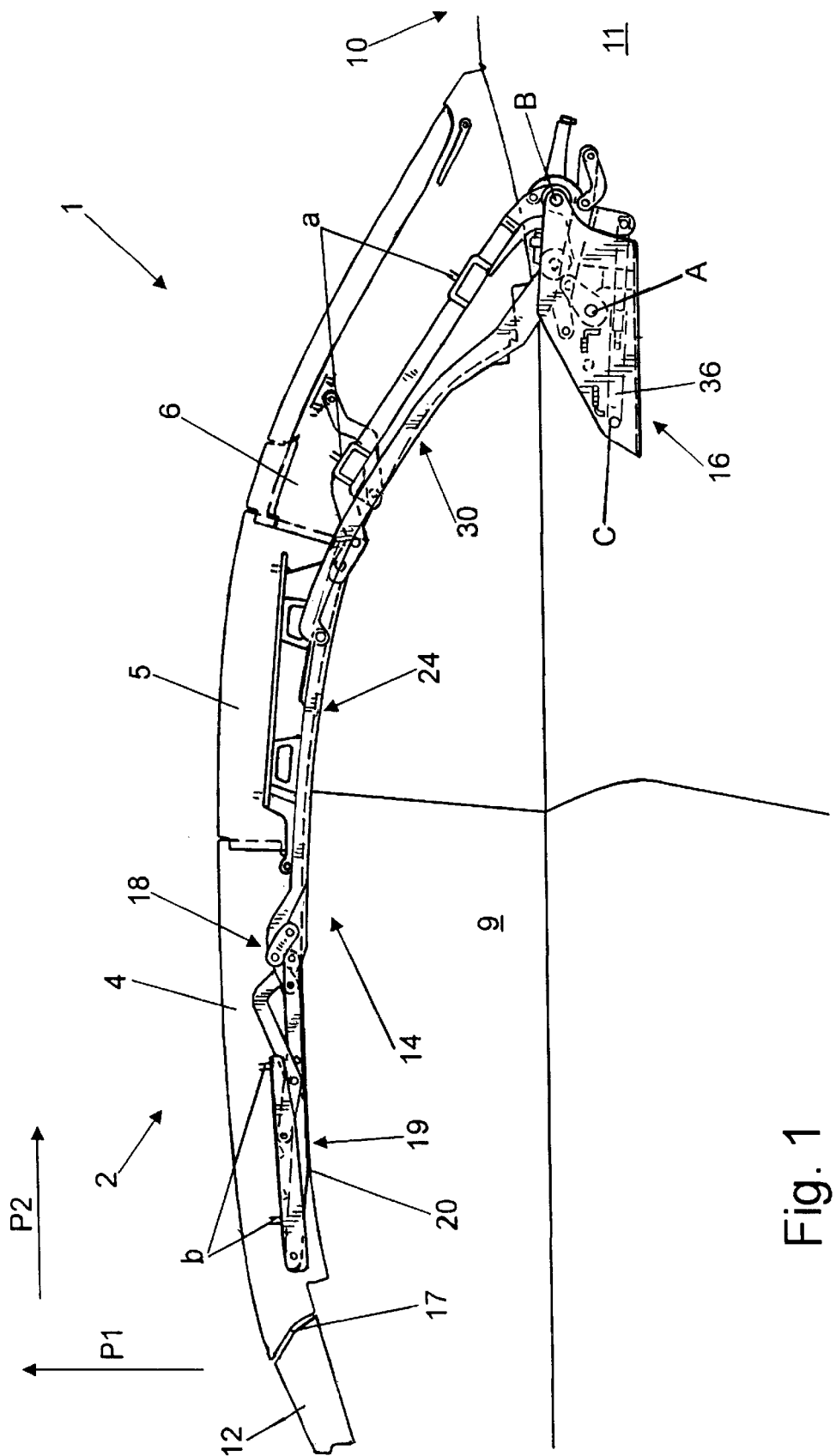
FIG. 1 shows a schematic side view of a preferred exemplary embodiment of a convertible top together with a driving device according to the invention in the closed state on a vehicle.

In FIG. 1, a vehicle 1 having a convertible top 2 is illustrated in a side view. In a manner visible from the outside, the convertible top 2 comprises a front shell piece 4, a middle shell piece 5 and a rear shell piece 6 which, when in the closed state, are arranged as a roof having a uniform outer contour over a passenger compartment 9. The roof extends for this purpose from a region 10 of a trunk 11 as far as a frame of a windshield 12.

A mechanism of bars in the form of a chain 14 is provided below the shell pieces 4, 5, 6. The chain 14 can therefore not be seen from the outside. The mechanism of bars has the task of ensuring the sequence of operation of a positive-control means in a form as described below. For this purpose, the mechanism of bars is designed in the form of the chain 14 and extends from two bearing points A, B of a main bearing 16 in the region 10 of the trunk 11 of the vehicle 1 virtually as far as a roof point 17, which forms the region of contact of the front shell piece 4 with the frame of the windshield 12. Arranged in the region of the main bearing 16 is a driving device which is also illustrated and described in detail below in enlarged illustrations. Starting from this driving device a force is transmitted via the chain 14 to all of the shell pieces 4, 5, 6. The construction of the chain 14 from coupled four-bar linkages 18, 19, 24, 30 produces a certain kinematic arrangement during the opening and closing of the convertible top 2, which arrangement is now described by an illustration of a first step of the opening movement with reference to FIG. 2 and of a second step of the opening movement with reference to FIG. 3 using the movement arrows P1, P2, P3 and P4.

The front shell piece 4 is raised along the arrow P1 and displaced along the arrow P2 counter to the direction of travel. Both movements immediately start with a rotational movement, caused at the main bearing 16 by the driving device, along the arrow P3. In their extent, the three movements differ in strength, so that first the raising along P1 is dominant. By this means, the front shell piece 4 can be raised over the middle shell piece 5 and then moved over the middle shell piece 5. This movement is essentially controlled by the four-bar linkages 18, 19 below the front shell piece 4, the front shell piece 4 being fastened to a four-bar linkage 19 which is formed out as a parallelogram mechanism and which is activated via a small four-bar linkage 18 mounted upstream of it. The dimensioning of the parallelogram mechanism 19 essentially determines, by means of the length of links 20, 21, the maximum height that the front shell piece 4 can be raised over the middle shell piece 5, with the result that these parts cannot come into undesirable contact and therefore be damaged during opening or closing.

However, this type of opening movement also has further advantages: the roof tip 17 is generally fixed or secured in a known manner by means of a fastener (not illustrated here in further detail) or in a holding device in the region of the windshield 12. The described commencement of the opening movement is matched in a particular manner to a release operation of the roof point 17 from the fastener or plurality of fasteners. Furthermore, raising prior to the commencement of the actual displacement movement protects seals situated between the parts to a very high extent, since only small shearing forces therefore occur at the seals. The illustrated opening movement is therefore also largely free of wear concerning the seals in the intermediate regions of the abovementioned parts.

Figure 2:
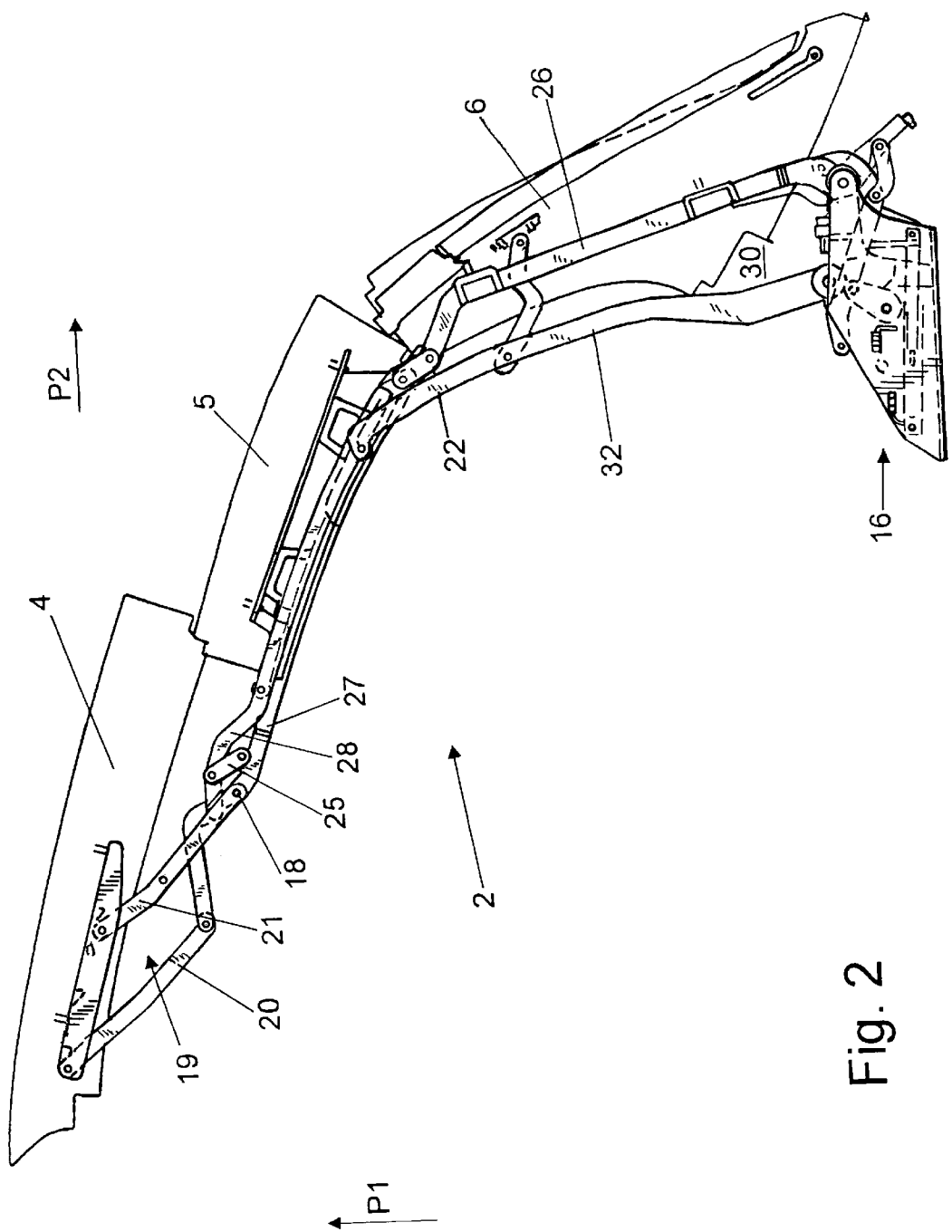
FIG. 2 shows the convertible top from FIG. 1 in a first step of the opening movement.
Figure 3:
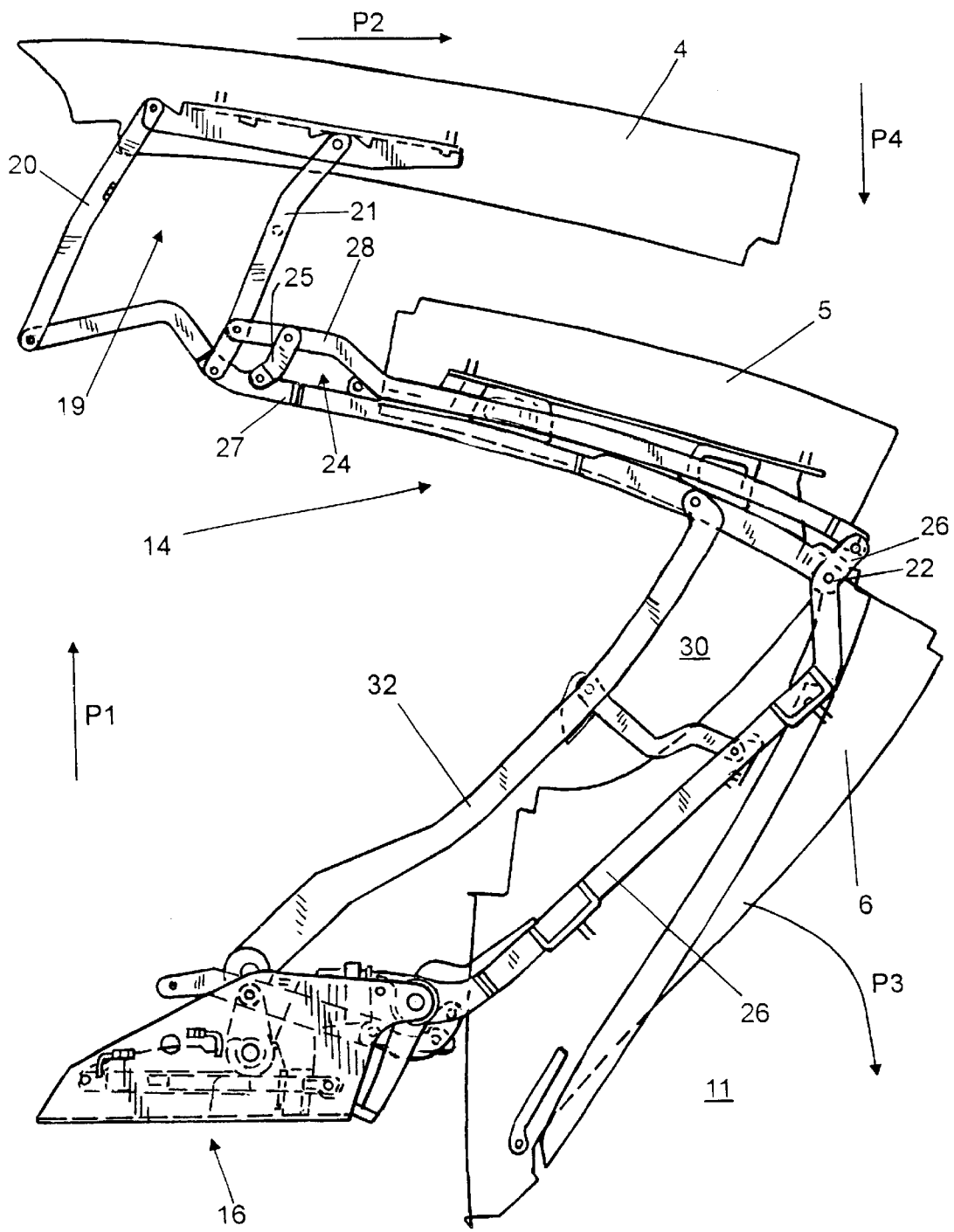
FIG. 3 shows the convertible top from FIG. 1 in a second step of the opening movement.

In contrast, in this first phase of the opening movement there is no very complex relative movement between the middle shell piece 5 and the rear shell piece 6. Deviating from the present exemplary embodiment, these parts may be coupled to one another via a hinge point 22. Then, during the further course of the opening movement, they execute a purely rotational movement about the hinge point 22. The movement according to the present exemplary embodiment of FIG. 2 and FIG. 3 is characterized by the combining of a rotational movement with a translatory movement, so that more than just the formation of a gap between the middle shell piece 5 and the rear shell piece 6 can be seen. In each case, the middle shell piece 5 has also been clearly moved along the arrow P2 from its initial position. A comparison of the illustrations of FIG. 1 and FIG. 3 shows that the rear shell piece 6 has also been rotated along the arrow P3 from its initial position toward an oppositely directed storage position in the region of the trunk 11.

FIG. 3 therefore illustrates a virtually maximum height deflection of the convertible top 2 during the opening operation. The movement along the arrow P1 has therefore essentially come to an end here. Dominant in this state is the displacement of the front shell piece 4 and of the middle shell piece 5 along the arrow P2 together with the beginning of a lowering of these parts along arrow P4 into the region of the trunk 11. The rotation of the rear shell piece 6 has already been approximately half finished here.

In the illustration according to FIG. 3, the construction of the chain 14 with the individual parts can be seen particularly well. The parallelogram mechanism 19 has already exceeded the vertex of its opening and is merging from a rectangle via the illustrated parallelogram into a second end position. The same applies to the connected four-bar linkage 18 via which the parallelogram mechanism 19 is essentially activated. On the other side of the four-bar linkage 18, the chain 14 is continued by a further four-bar linkage 24 whose virtually parallel legs 25 and the leg piece of the first link 26 are very short, so that the substantially longer links 27, 28 seem to lie directly one above the other. The links 27, 28 each have a plurality of hinge points, so that they are also part of a plurality of four-bar linkages 18, 19, 24 and 30. They therefore cover a very wide region over the passenger compartment 9 from the hinge point 22 in the vicinity of the rear shell part 6 as far as the front shell piece 4 in the region of the roof point 17. In this arrangement, the links 27, 28 are designed so that they are bent in order to bring about the activation of the individual four-bar linkages 18, 19, 24 in the desired form. A further positive effect of the illustrated formation of the links 27, 28 in particular is the production, in the closed position according to FIG. 1, of a profile extending overall in a curved shape and being ideally matched to the profile of the convertible top 2.

The chain 14, for example even as a whole, can therefore be readily integrated in the inner panel or in the roof lining. Options include, for example, channels in the roof lining into which the links of the chain 14, which links are in each case arranged toward the side of the passenger compartment 9, can be introduced in the closed position of the convertible top 2. Lips or bristle strips arranged on one side or both sides of channels of this type can close the channels in the closed end position. Elements of this type can be matched in a known manner in design and also color to the particular interior of the vehicle 1. Alternatively, two chains 14 on outer longitudinal edges of the convertible top 2 may, for example, be arranged in recesses. These recesses may be part of the door frames.

In the closed end position according to FIG. 1, a four-bar linkage 30 is folded together almost as tightly as the four-bar linkage 24. With the main bearing 16 as the base point, the four-bar linkage 30 forms the fixed connection of the chain 14 to the vehicle 1. Furthermore, a driving device in the region of the main bearing 16 acts on the four-bar linkage 30, as is also described below. In order to optimize their function and position in both end positions, a first link 26 and a second link 32 of the four-bar linkage 30 are also designed such that they are bent.

In the illustrated and preferred embodiment of the invention, each part of the total of four four-bar linkages 18, 19, 24, 30 is designed in the form of a link. An increase in the mechanical rigidity of the chain 14 is therefore brought about, since recourse is not necessarily made to the rigidity of the shell pieces 4, 5, 6. This also results in simple assembly of the chain 14 with the shell pieces 4, 5, 6, for example via tabs with screw connections or welding connections or a bonding connection or the like, as indicated in a region of contact a of the four-bar linkage 30 on the first link 26 with the rear shell piece 6 and a region of contact b of the parallelogram mechanism 19 with the front shell piece 4.

Furthermore, in the chain 14 which is illustrated, the hinge points are predominantly designed in a known and therefore very reliable technique as swivel joints. In comparison with sliding bearings, swivel joints have the advantage that they can be provided in a simple manner, for example by provision of sliding sleeves or the like, with permanently good and maintenance-free lubrication. Sleeves, disks or similar elements having a Teflon coating are preferably used here in the swivel joints.

However, in certain applications sliding bearings can also be used. However, the use of sliding bearings instead of swivel joints may also cause problems to arise in particular because of a free combination of translatory and rotational movement inter alia in the point of connection or transition between these types of movement, since undefined positions of the mechanism may arise during or at the end of the largely arbitrary movement sequences. However, the use of sliding bearings is only optional, since a convertible top 2 according to the invention in principle also operates correctly and reliably without the use thereof.

Figure 4:
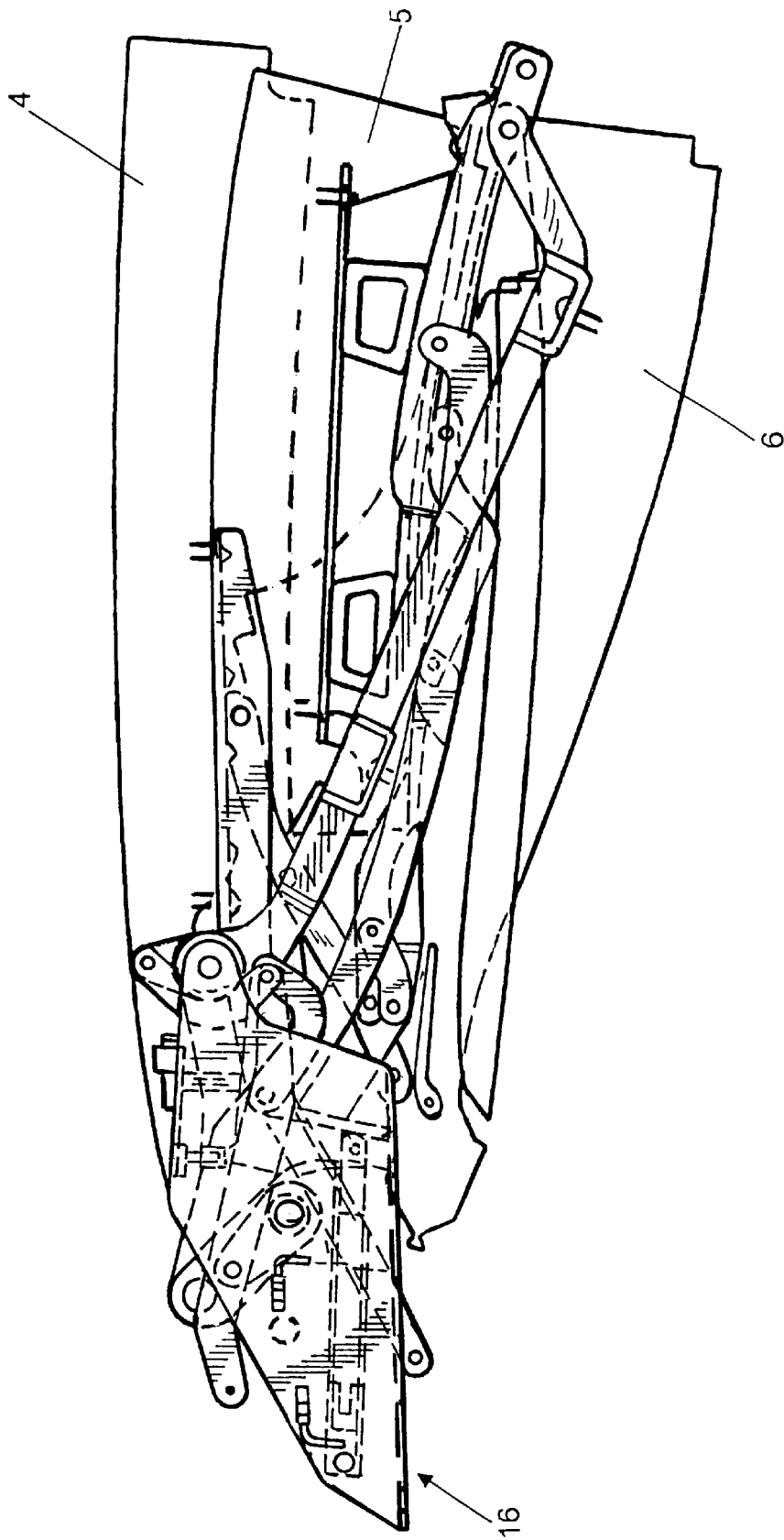
FIG. 4 shows the convertible top from FIG. 1 in an opened end position.

In a final step of the opening movement, the convertible top 2 is lowered, in the transition from FIG. 3 to FIG. 4, in a movement with a substantial component in the direction of arrow P4 into the region 10 of the trunk 11 of the vehicle 1 in such a manner that the front shell piece 4 is arranged over the middle shell piece 5 in the same direction and the two parts 4, 5 are arranged over the rear shell piece 6. In the process, the rear shell piece 6 has been rotated along the arrow P3 into a position folded over with respect to its initial position. The abovementioned parts 4, 5, 6 are situated in such a manner that the links 27, 28, as some of the longest parts of the convertible top 2, are arranged between the front shell piece 4 and the middle shell piece 5, on the one hand, and the folded-over, rear shell piece 6. In this form, in spite of the protection by means of the shell parts, the links 27, 28 do not produce, together with the first link 26, a substantial lengthening of the convertible top 2 in the axis of the maximum extension of its packing position.

An essential feature of this arrangement of the parts of the convertible top 2 is that the shell pieces 4, 5, 6 have not even been placed one inside another. Rather, the parts of the illustrated embodiment rest one on another, see FIG. 4. By this means, no particular restrictions with regard to the shape and/or size of a particular shell piece are applied. Therefore, virtually any roof shape can be realized by means of a convertible top according to the invention. Nesting the shell parts 4, 5, 6 in one another taking into consideration the inevitably resultant limitations can further increase the packing density of the convertible top in its packing position. The space required overall in the region 10 of the trunk 11 of the vehicle 1 can therefore be reduced further.

An essential element of this embodiment is a special driving device which is arranged in the region of the main bearing 16 and is described in respect of its function and its construction with reference to FIGS. 5 to 12. The driving device comprises a hydraulic driving cylinder 36 which is mounted, in a manner such that it can pivot on one side, on a bearing point C in the region of the main bearing 16. In a known manner, the hydraulic driving cylinder 36 may, for example, be arranged between the fixed bearing point C and a further bearing point, the second bearing point being situated in a central region of the second link 32. In contrast, the hydraulic driving cylinder 36 according to the present embodiment is coupled in a novel manner to the chain 14 so as, among other things, to improve the driving characteristics of the driving device. For this purpose, the four-bar linkage 30 is matched to the driving device by a lengthening of the bearing-side, bent ends of the first link 26 and of the second link 32. The lengthened portion of the first link 26 is designed as a double lever 35 which can be pivoted about the bearing point B of the main bearing 16.

Figure 5:
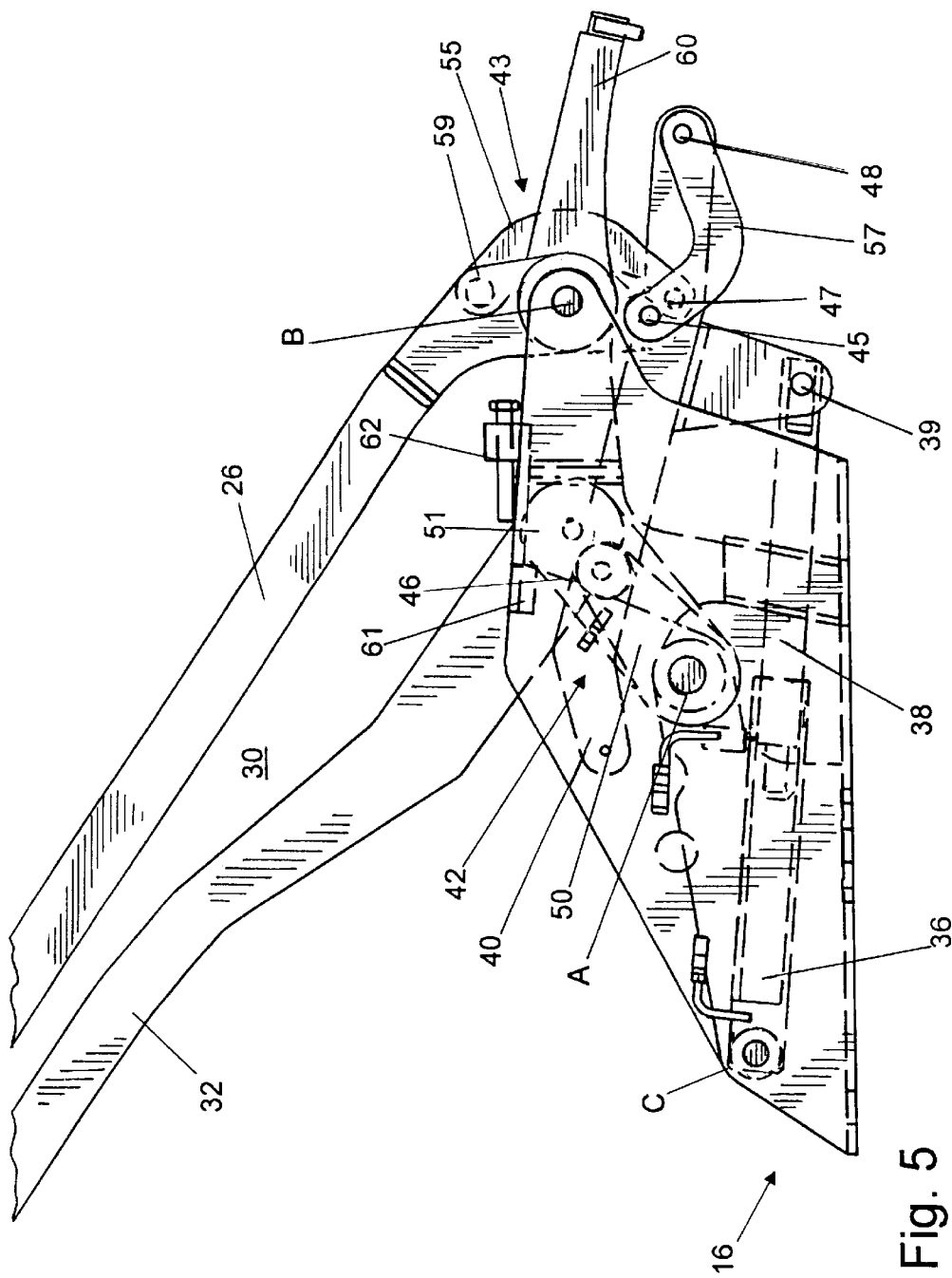
FIG. 5 shows an enlarged illustration of the driving device of the convertible top from FIG. 1.

FIG. 5 shows an enlarged illustration of the region about the driving device of a convertible top 2 according to the invention in the closed position of FIG. 1. The basic construction of the driving device together with its component parts can therefore be seen precisely. The driving cylinder 36 has an extended piston rod 38 which is connected via an end-side hinge point 39 to a push and pull rod 40. The push and pull rod 40 is designed for the simultaneous driving of a link system 42 and of a four-bar linkage 43. For this purpose, the push and pull rod 40 is provided with a first hinge point 46, a second hinge point 47 and a third hinge point 48. The four-bar linkage 43 is designed as a cross joint, i.e. two links 55, 57 of this sub-mechanism, which is not capable of revolving, cross over each other in every possible position.

The construction of the four-bar linkage 43 in detail is as follows: at the third hinge point 48 the push and pull rod 40 is connected to a first bent link 57 which is coupled via a fifth hinge point 45 to an end of the double lever 35. On the other side of the fixed bearing point B, the double lever 35 is connected via a fourth hinge point 59 to a second bent link 55. The link 55 is connected again to the push and pull rod 40 via the second hinge point 47. This completes the cross joint 43.

The construction of the link system 42 belonging to the second link 32 of the convertible top in detail is as follows: an intermediate link 50 is connected, in a manner such that it can pivot at the fixed bearing point A, to the main bearing 16. At the other end of the intermediate link 50, the second link 32 and the intermediate link 50 are connected pivotably in the hinge point 51. The push and pull rod 40 is connected to the intermediate link 50 in a first hinge point 46 which lies between the hinge point 51 and the bearing point A. In this arrangement, the intermediate link 50 is shaped because of structural conditions in such a manner that the first hinge point 46 lies in a different plane than the hinge point 51 and the bearing point A.

Figure 6:
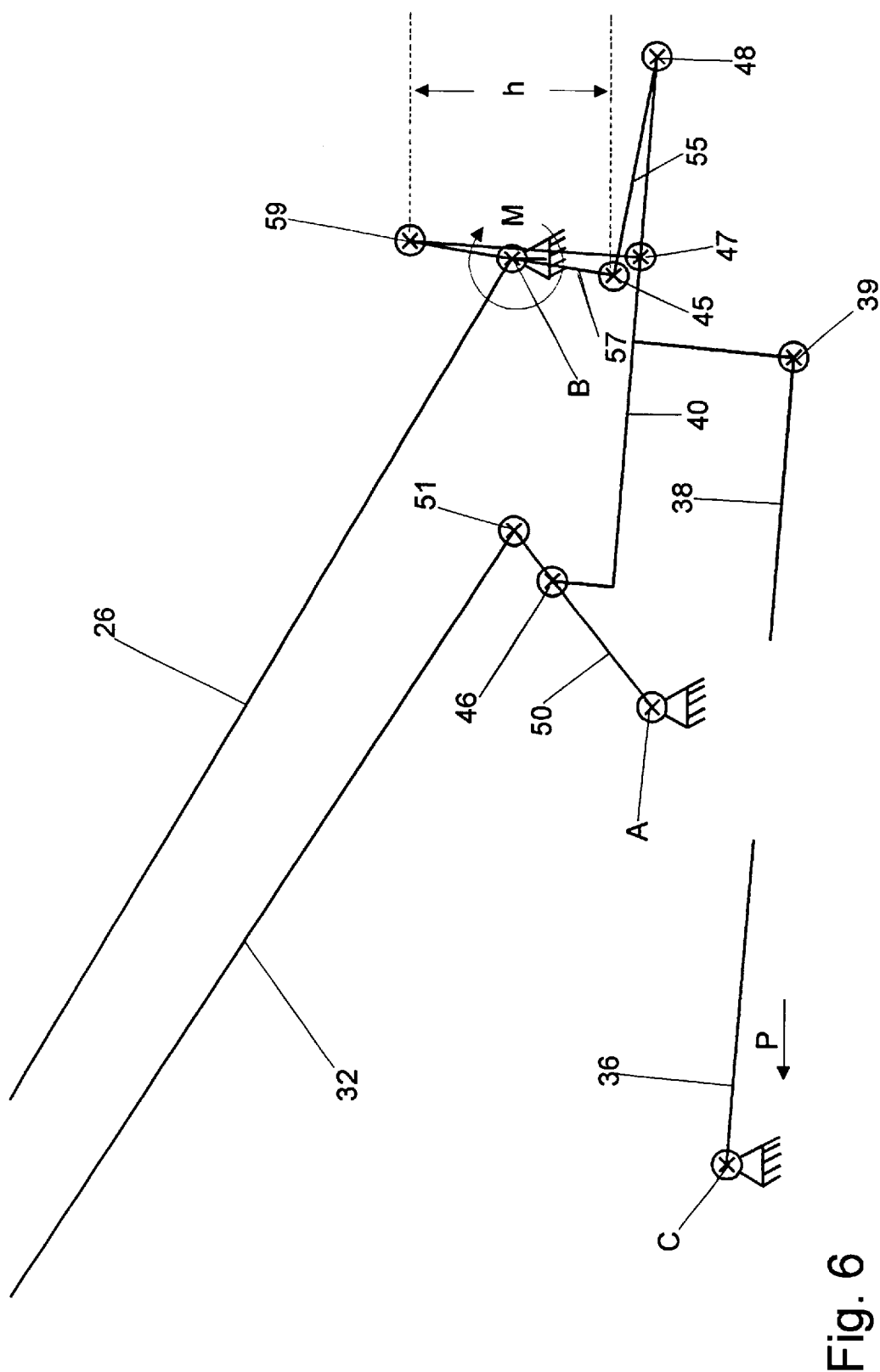
FIG. 6 shows a schematic illustration of the links and hinge points in the position of FIG. 5.

The above-described, basic construction of the driving device is reproduced in FIG. 6 in the form of a schematized illustration of the links and hinge points involved in the position as illustrated in FIG. 5. For the purpose of comprehension it should be taken into consideration here that the linear pieces drawn in concern lines of force, i.e. furthermore concern links or levers and not bars in the purely mechanical sense. Links or levers can also transmit forces which do not act in the direction of their axis. Bars, in contrast, can only transmit forces along their axis.

In order to describe the advantageous effect of this construction using the cross joint 43, there has furthermore been entered in FIG. 6 an arrow P which reproduces the direction of the force exerted on the arrangement by the driving cylinder 36 via the push and pull rod 40. Taking into consideration the virtually perpendicular position of the push and pull rod 40 with respect to the double lever 35 with a lever arm h, this force produces a torque M about the bearing point B. In reaction to this torque M the first link 26 is then rotated in the direction of the arrow drawn in and the following mechanism of bars comprising coupled four-bar linkages is driven for the purpose of opening the convertible top 2 (FIG. 1).

Figure 7:
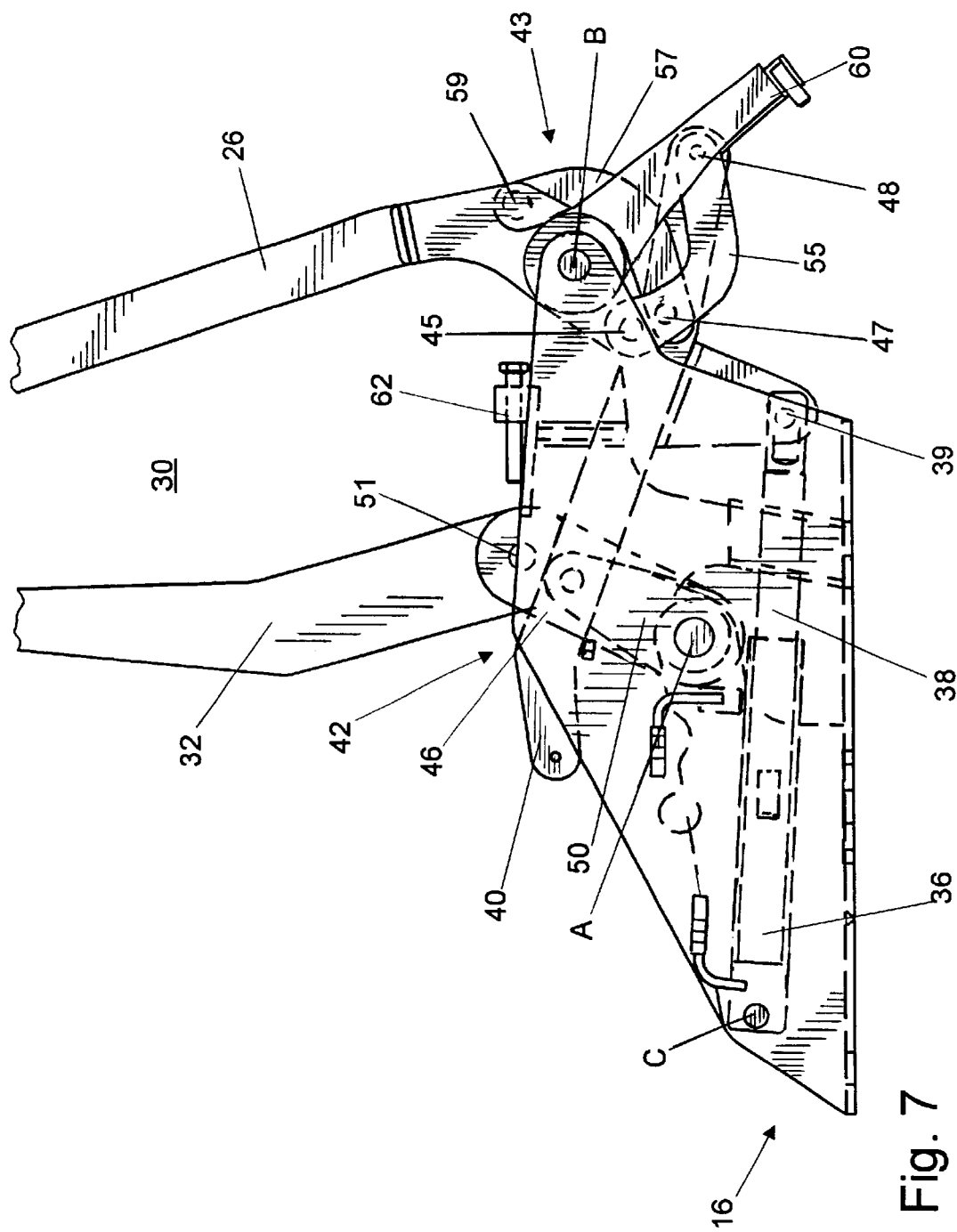
FIG. 7 shows an enlarged illustration of the driving device in the first opening position from FIG. 2.
Figure 8:
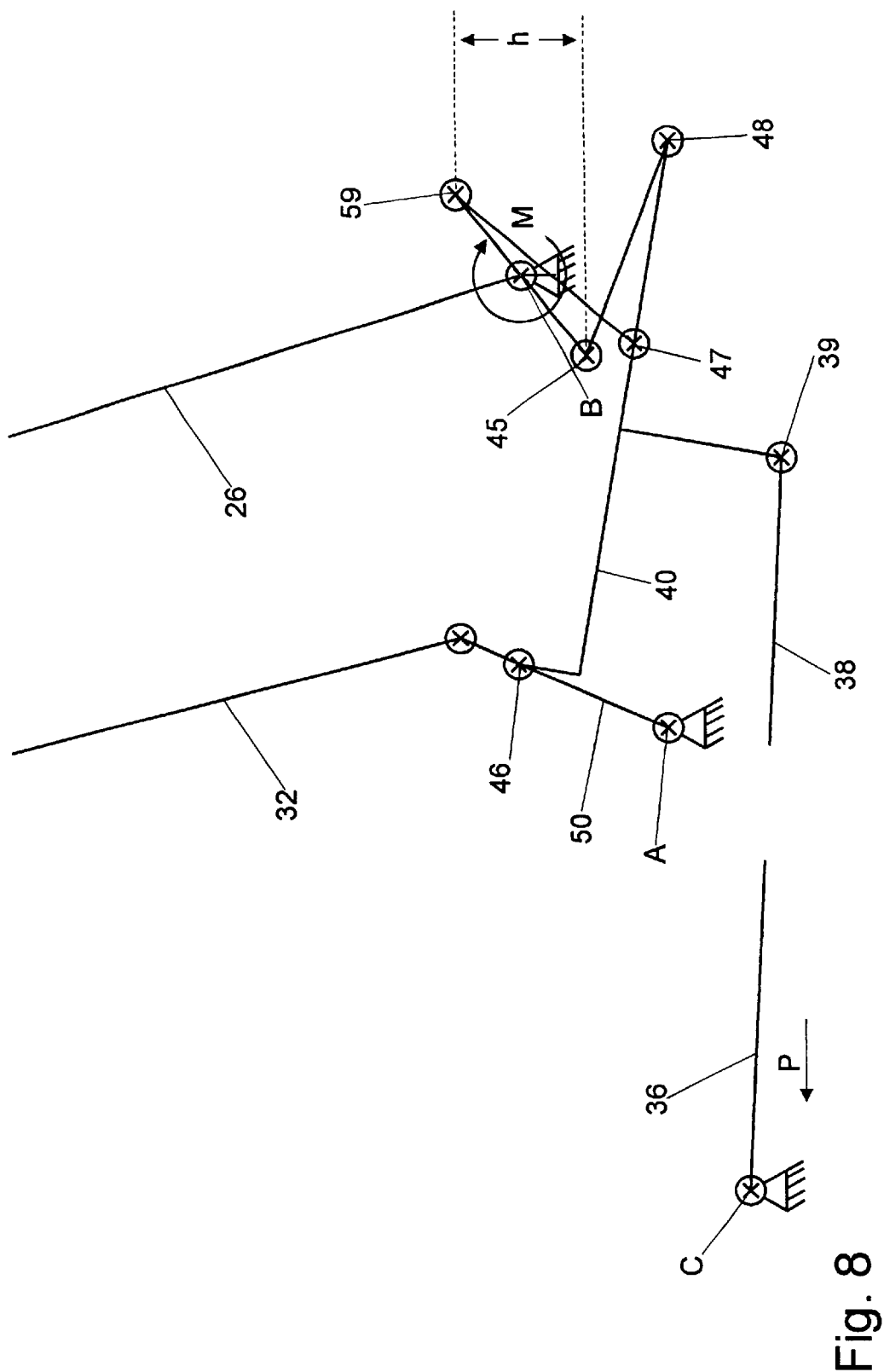
FIG. 8 shows a schematic illustration of the links and hinge points in the position of FIG. 7.
Figure 9:
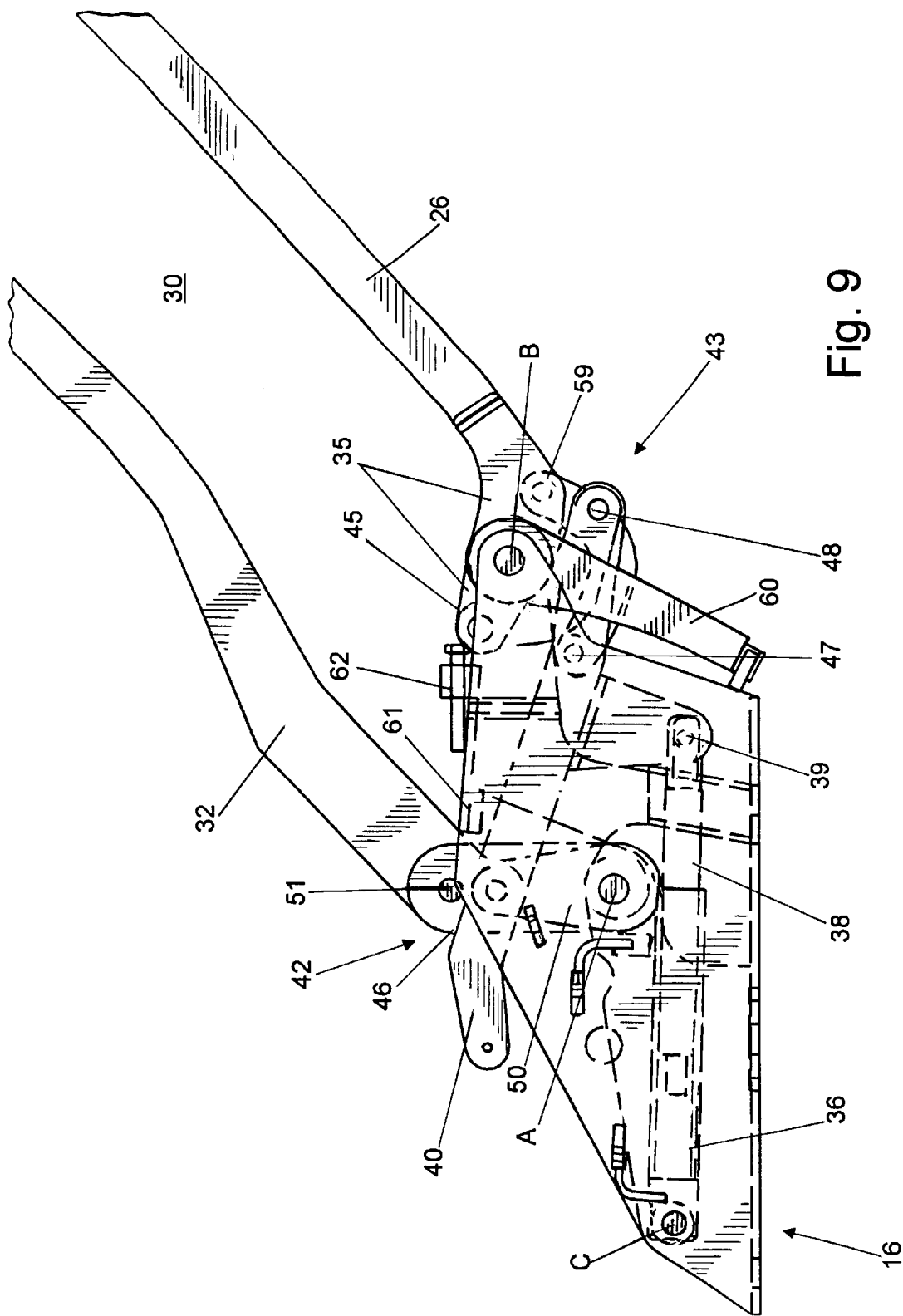
FIG. 9 shows an enlarged illustration of the driving device in the second opening position from FIG. 3.
Figure 10:
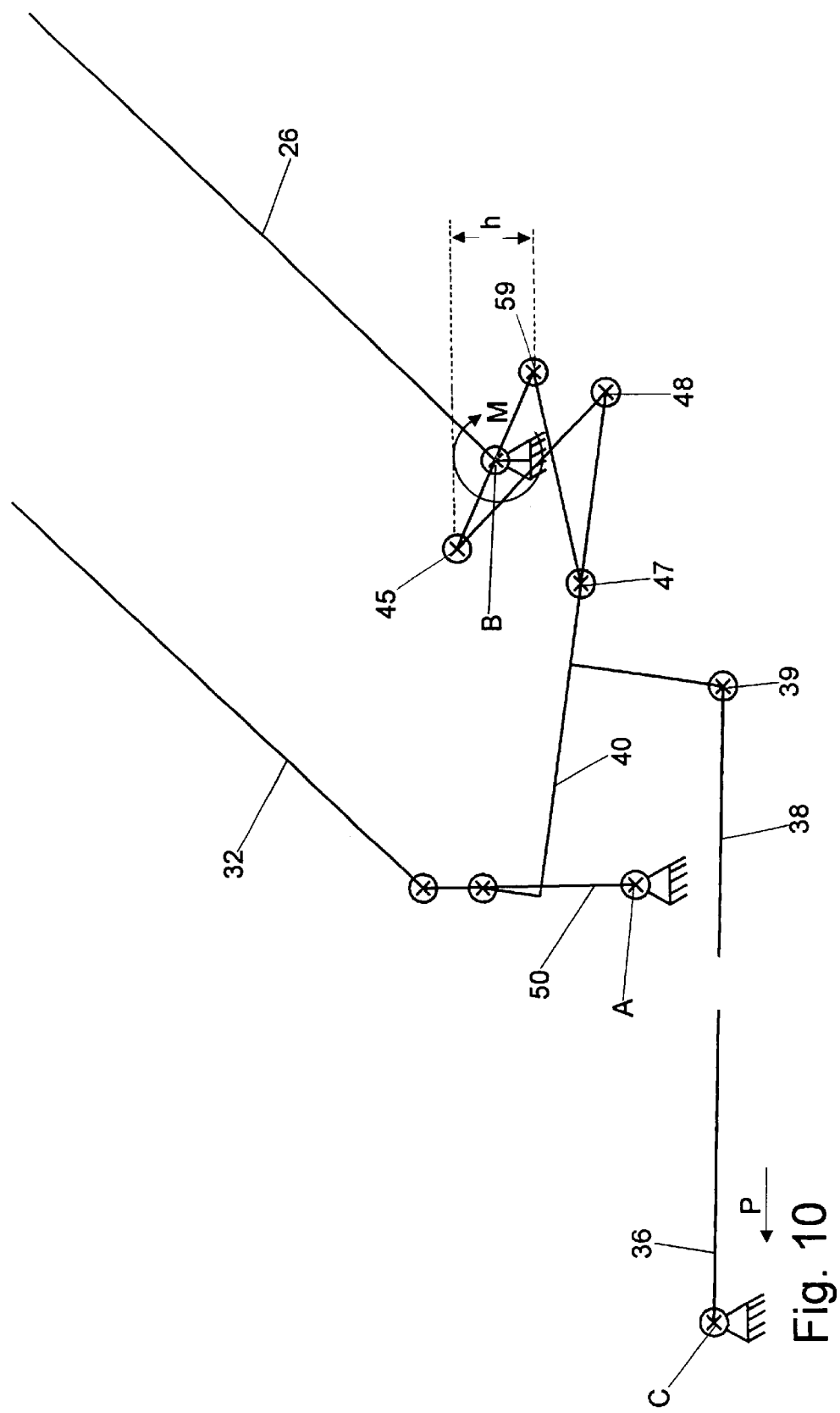
FIG. 10 shows a schematic illustration of the links and hinge points in the position of FIG. 9.
Figure 11:
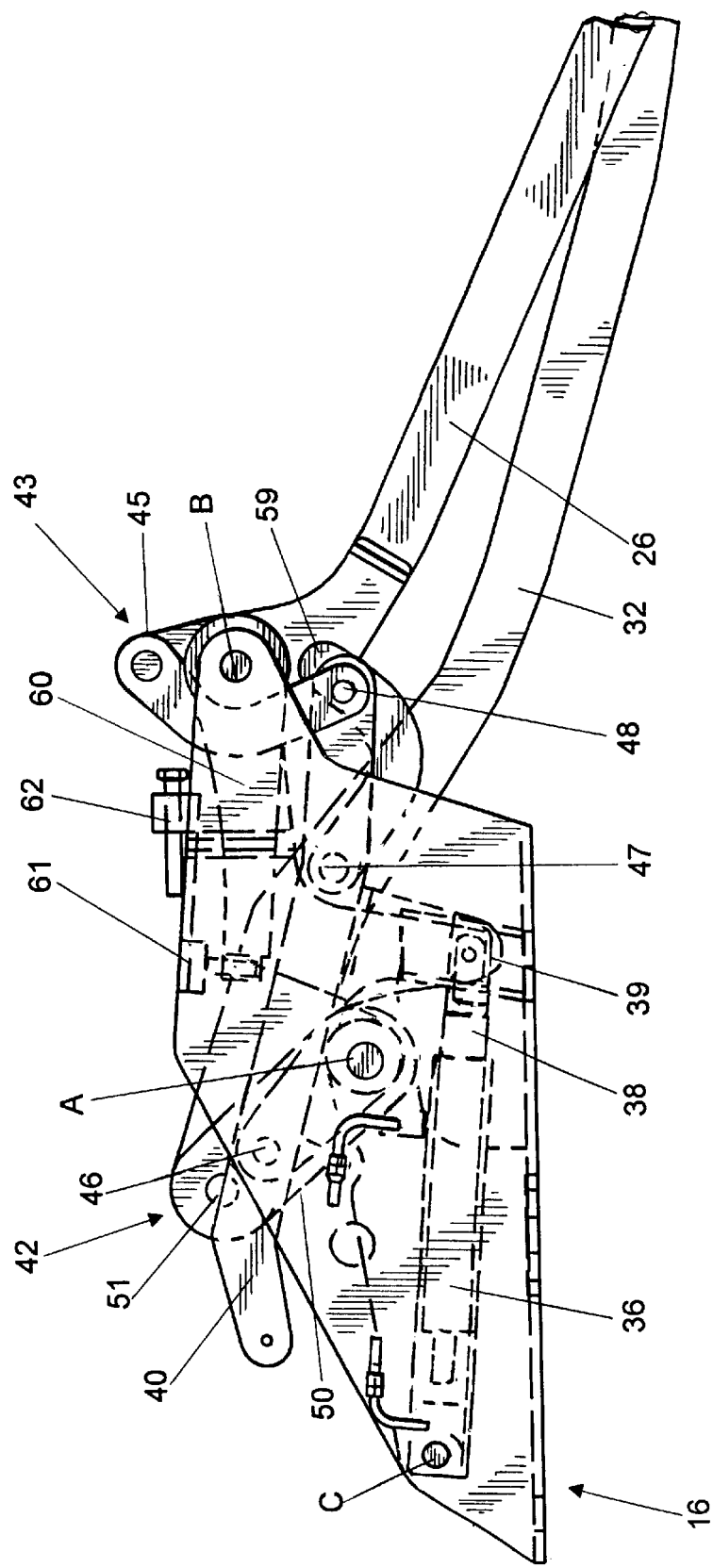
FIG. 11 shows an enlarged illustration of the driving device in the open end position from FIG. 4.
Figure 12:
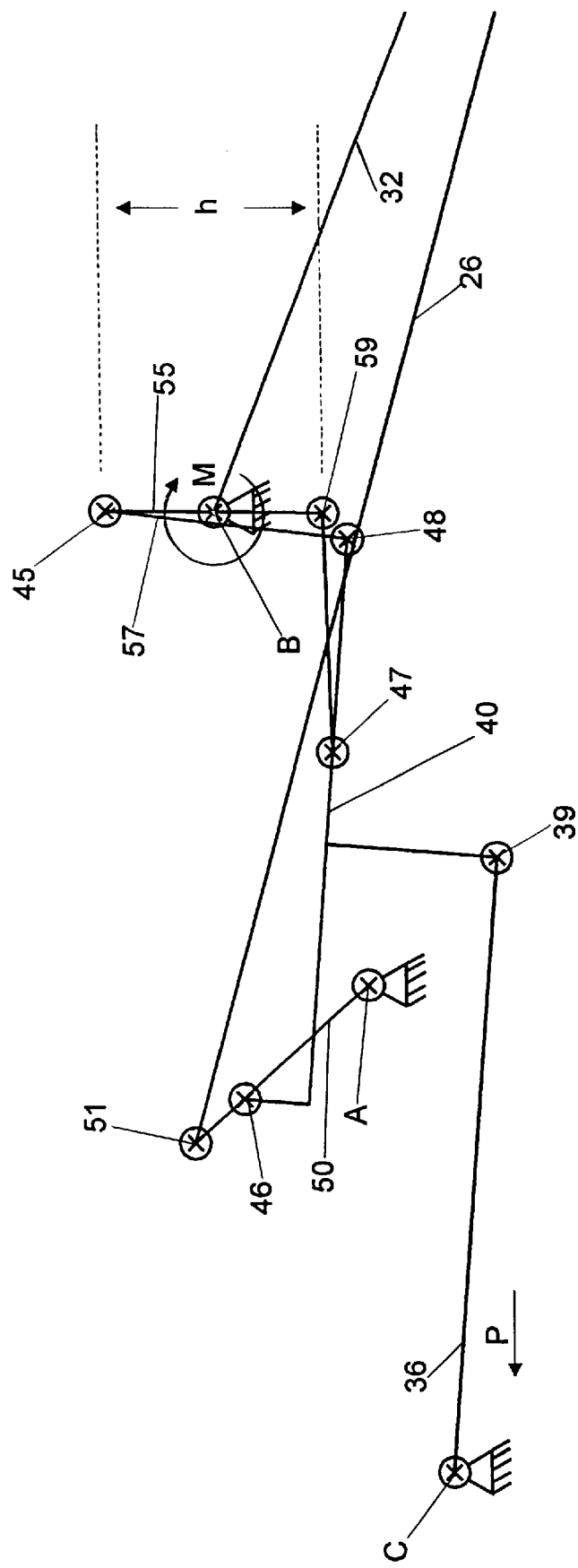
FIG. 12 shows a schematic illustration of the links and hinge points in the position of FIG. 11.

The change in the position of the individual elements of the driving device from the closed position according to FIG. 5 is shown below in enlarged illustrations of the driving region as intermediate positions in FIG. 7 and FIG. 9 and as an open end position in FIG. 11. Respectively associated therewith FIGS. 8, 10 and 12 reproduce a schematized illustration of the links and hinge points in particular taking into consideration the lever ratios at the cross joint 43 in a similar manner to the illustration from FIG. 6. In a comparison of FIGS. 10 and 12, a considerable change in the magnitudes of the respective lever arms h at the cross joint 43 can be ascertained. With the same force exerted by the magnitude P, because of these changes in the respective effective lengths of the lever arms, torques M differing greatly in size are therefore produced at the beginning and at the end of the opening movement and in an intermediate position. The lever arms h are therefore at a respectively maximum size in the extreme positions or end positions, while they are small in a central region of the movement with a relatively large speed in the described system. The torque is therefore particularly large especially at the beginning of the movement from a static or inoperative extreme position, where a large driving torque is also used for starting the movement. There is therefore a force and speed distribution which is matched to the actual requirements during opening and closing of a convertible roof and is therefore substantially improved with respect to known systems during the movement sequence. This distribution is advantageously produced without a further controlling intervention on the driving cylinder 36 itself. An additional controlling intervention can be made at the end of the respectively finishing movement, for example shortly before an extreme or end position which is aimed at is reached, in order to assist in a gently expiring movement. For this purpose, the force output by the driving cylinder 36, in particular, can be controlled.

Via the intermediate link 50 which can be moved by the push and pull rod 40, the link system 42 has the effect that the second link 32 of the convertible top does not execute a purely rotational movement about the fixed bearing point A, but, further caused by its coupling to the further links of the chain 14, rather executes a combination of a rotating movement about the bearing point A and a translatory movement relative to the bearing point A. It can therefore be ensured, by suitable selection of the length of the intermediate link 50 and the connection to the push and pull rod 40 in the first hinge point 46, that the chain 14 of the convertible top can be driven by the driving device according to the invention without jamming.

A stop arm 60 is secured to the second link 32 in the region of the bearing point B and moves together with the second link. A limitation of the movement of the driving device is provided by means of a stop 61 on which the stop arm 60 acts in the one end position of the driving device. This limitation can be adjusted precisely via adjusting screws in order to take the tolerances of the entire mechanism into consideration. A second adjustable stop 62 is provided on the main bearing and the second link 32 acts against it in the corresponding other end position of the driving device.

Compared with drives from the prior art, with a driving device described comparatively extreme end positions can be reached, in which the activated first and second links 26, 32 are rotated even about angles of rotation of more than 180° about the bearing points A, B during the transfer from one end position into the other end position. It is therefore even possible, if required, to realize drives with first and second links 26, 32 which cross over in the region of the fixed bearings A, B.

It should also be pointed out here that the driving cylinder 36 has only moved through an angle of a few degrees during the entire movement from the closed to the open position. Therefore, in addition to the temporal distribution of the driving force there has also been a substantial improvement in the spatial input of the force within the driving system as compared with the conventional driving solution described at the beginning. An above-described driving device therefore requires substantially less free space than comparable arrangements. As a result, the described driving device can be arranged in a very compact form and in a stable and well-protected manner in the region of the C-pillar of a motor vehicle. An advantageous distribution of the driving force to the main pillar and main link has also been made possible.

The above-described embodiment of a convertible top 2 according to the invention relates only to a three-part convertible top with rigid shell parts. However, this embodiment can also be used with slight adaptation for folding tops with a completely or partially flexible roof skin. A folding top with a partially flexible roof skin may, for example, contain a rigid rear window or other or further rigid parts. Further links may be arranged on the chain 14 in a known manner, said further links being connected to the flexible roof skin for shaping purposes. By means of the positive control in a convertible top 2 according to the invention, a convertible top 2 of this type having a partially flexible roof skin is also moved reliably and safely by the kinematic arrangement with low dynamic stressing of sensitive parts. It is also possible within this framework to form one of the shell pieces 4, 5, 6 as a roll bar between two chains 14 and to couple it to a flexible roof skin. In a convertible top according to the invention, these bars do not have to be directly activated; a simple coupling suffices here because of the influence of the flexible roof skin, as is known from the prior art from the sphere of flexible convertible tops. However, the integration of a roll bar in the convertible top in exchange for the known links, which are configured more just for the shaping of the convertible top, is novel.

What is claimed is:

1. A driving device for a convertible top, comprising
   a main bearing having a first fixed bearing point;
   a first link, said first link being pivotally connected to said main bearing at the first fixed bearing point;
   a driving cylinder;
   a push and pull rod;
   a first bent link; and
   a second bent link;
   wherein the first link includes a double lever having two hinge points, said two hinge points each being positioned on different sides with respect to said first fixed bearing point;
   wherein said push and pull rod is coupled to one of said two hinge points via said first bent link;
   wherein said push and pull rod is coupled to the other of said two hinge points via said second bent link; and
   wherein the driving cylinder provides a force acting upon said push and pull rod.

2. The driving device as claimed in claim 1, further comprising a second link and an intermediate link, the intermediate link coupling the second link with the push and pull rod.

3. The driving device as claimed in claim 2, wherein the intermediate link is mounted at one end in a manner such that the intermediate link is pivotable in a joint on the second link, and is mounted at another end in a manner such that the intermediate link is pivotable about a second fixed bearing point of the main bearing.

4. A driving device for a convertible top, comprising
a main bearing;
a cross joint including a first link, a push and pull rod, and at least two further links, said first link being pivotally connected to said main bearing in a first fixed bearing point; and
a driving cylinder for producing a driving force, the driving force producing a torque about said first fixed bearing point, the driving force acting on said cross joint so as to define an effective lever arm distance of the cross joint; and
wherein the torque at a beginning and at an end of an opening movement of the convertible top is larger than the torque at an intermediate position between the beginning and the end of the opening movement as a result of a larger size in the effective lever arm distance.

5. The driving device as claimed in claim 4, wherein the effective lever arm distance is at a maximum at the beginning and the end of the opening movement of the convertible top.

6. The driving device as claimed in claim 4, wherein a first of the at least two further links corresponds to a maximum effective lever arm distance at the beginning of the opening movement and a second of the at least two further links provides corresponds to a maximum effective lever arm distance at the end of the opening movement.

7. The driving device as claimed in claim 4, wherein in the intermediate position of said opening movement the speed of the movement is larger than at the beginning and end of the opening movement.

8. The driving device as claimed in claim 4, further comprising a second link and an intermediate link, the intermediate link coupling the second link with the push and pull rod.

9. The driving device as claimed in claim 8, wherein the intermediate link is mounted at one end in a manner such that the intermediate link is pivotable in a joint on the second link, and is mounted at another end in a manner such that the intermediate link is pivotable about a second fixed bearing point of the main bearing.

10. A driving device for a convertible top, comprising
a main bearing;
a first link being pivotally connected to said main bearing in a bearing point of said main bearing:
a driving cylinder;
a push and pull rod, the driving cylinder providing a force acting upon said push and pull rod;
a first cross-joint link; and
a second cross-joint link;
the first link including a double lever having two hinge points, said two hinge points each being positioned on different sides with respect to said fixed bearing point;
wherein said push and pull rod is coupled to one of said two hinge points via said first cross-joint link;
wherein said push and pull rod is coupled to another of said two hinge points via said second cross-joint link, such that at a beginning of an opening movement of the convertible top torque is exerted about said first fixed bearing point onto said first link by one of said first cross-joint link and said second cross-joint link and at a beginning of a closing movement of the convertible top torque is exerted about said first fixed bearing point onto said first link by the other of said first cross-joint link and said second cross-joint link.

* * * * *